(12) United States Patent
McClintock et al.

(10) Patent No.: US 10,515,212 B1
(45) Date of Patent: Dec. 24, 2019

(54) TRACKING SENSITIVE DATA IN A DISTRIBUTED COMPUTING ENVIRONMENT

(71) Applicant: Amazon Technologies, Inc., Seattle, WA (US)

(72) Inventors: Jon Arron McClintock, Seattle, WA (US); Matthew James Parker, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 516 days.

(21) Appl. No.: 15/189,824

(22) Filed: Jun. 22, 2016

(51) Int. Cl.
*G06F 21/56* (2013.01)
*G06F 21/62* (2013.01)
*G06Q 30/06* (2012.01)
*G06F 16/21* (2019.01)
*G06F 16/901* (2019.01)

(52) U.S. Cl.
CPC .......... *G06F 21/562* (2013.01); *G06F 16/211* (2019.01); *G06F 16/9024* (2019.01); *G06F 21/6245* (2013.01); *G06Q 30/0601* (2013.01)

(58) Field of Classification Search
CPC ............. G06F 21/562; G06F 17/30292; G06F 17/30958; G06F 21/6245; G06Q 30/0601
USPC .......................................................... 726/23
See application file for complete search history.

(56) References Cited

U.S. PATENT DOCUMENTS

| | | | |
|---|---|---|---|
| 4,931,928 A * | 6/1990 | Greenfeld | G06F 8/427 707/999.003 |
| 7,996,373 B1 * | 8/2011 | Zoppas | G06F 21/10 707/694 |
| 7,996,374 B1 * | 8/2011 | Jones | G06Q 10/10 707/694 |
| 8,365,291 B1 * | 1/2013 | Le | G06F 8/433 726/25 |
| 9,336,381 B1 * | 5/2016 | Kane-Parry | G06F 21/50 |
| 9,465,942 B1 * | 10/2016 | Kane-Parry | G06F 21/57 |
| 10,002,639 B1 * | 6/2018 | Gaeta | G11B 27/031 |
| 2004/0128552 A1 * | 7/2004 | Toomey | G06F 21/57 726/22 |

(Continued)

OTHER PUBLICATIONS

Cambria, E., and B. White, "Jumping NLP Curves: A Review of Natural Language Processing Research," IEEE Computational Intelligence Magazine, May 2014, pp. 48-57.

*Primary Examiner* — Lisa C Lewis
*Assistant Examiner* — Thanh T Le
(74) *Attorney, Agent, or Firm* — Davis Wright Tremaine LLP

(57) ABSTRACT

Computing resource service providers may operate a plurality of computing resources in a distributed computing environment. In addition, the computing resource server providers may provide customers with access to applications and/or services. The applications and/or services may include sensitive data. Sensitive data in the distributed computing environment may be tracked by analyzing source code associated with the applications and/or services. Analysis of the source code may include detecting operations associated with databases and generating schemas associated with the databases based at least in part on attributes included in the source code. Sensitive data may be detected based at least in part on the schemas generated by analyzing the source code.

20 Claims, 8 Drawing Sheets

(56) References Cited

U.S. PATENT DOCUMENTS

| | | | |
|---|---|---|---|
| 2005/0027981 A1* | 2/2005 | Baum-Waidner | H04L 63/102 |
| | | | 713/164 |
| 2006/0048224 A1* | 3/2006 | Duncan | G06F 21/10 |
| | | | 726/22 |
| 2008/0216174 A1* | 9/2008 | Vogel | G06F 21/6245 |
| | | | 726/22 |
| 2009/0138851 A1* | 5/2009 | Allen | G06F 8/70 |
| | | | 717/122 |
| 2010/0024037 A1* | 1/2010 | Grzymala-Busse | |
| | | | G06F 21/6245 |
| | | | 726/26 |

* cited by examiner

TRACKING SENSITIVE DATA IN A DISTRIBUTED COMPUTING ENVIRONMENT

BACKGROUND

Software development, including application development for distributed computing environments, has greatly increased in recent years. Organizations increasingly develop multiple applications in order to support a variety of different hardware platforms with different capabilities and features. These applications may be granted access to customer information that may be considered sensitive or private. This sensitive or private information may be inadvertently or purposely transmitted to third parties. For example, attackers may target host computer systems in an attempt to gain access to any sensitive or private information that may be maintained by the host computer systems. Additionally, it is often difficult in a distributed computing environment to determine what host computer systems executing various applications may have access to or may be used to access sensitive or private information either maintained by a particular host computer system or accessible to the particular host computer system.

BRIEF DESCRIPTION OF THE DRAWINGS

Various techniques will be described with reference to the drawings, in which.

DETAILED DESCRIPTION

Figure 1:
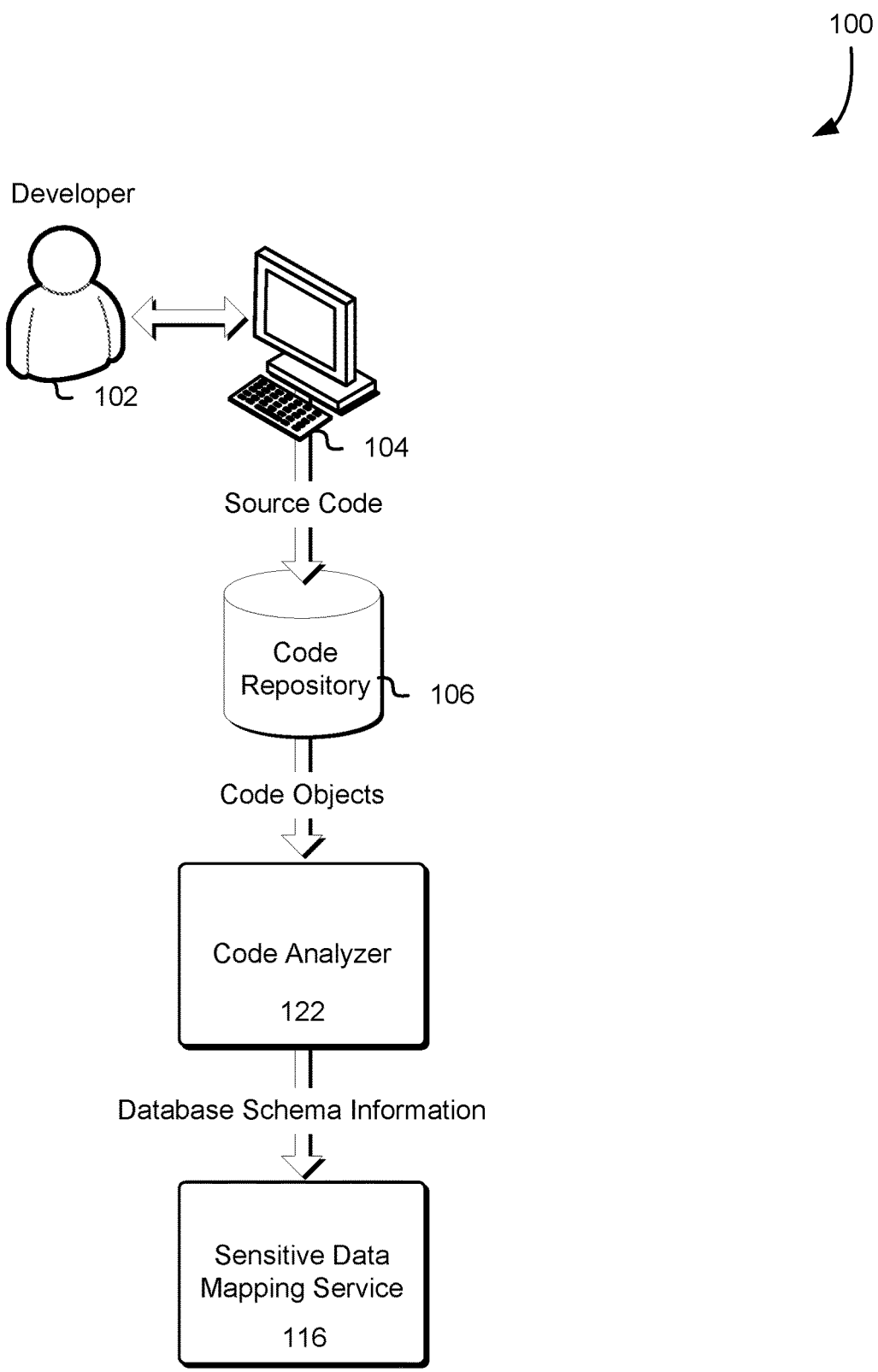
FIG. 1 illustrates an example environment in which a code analyzer may generate a schema for a database in accordance with an embodiment.

In various examples described below, a computing resource service provider provides customers with access to various applications and services. For example, the computing resource service provider provides the customer with access to an online retail marketplace accessed through a web application. Other examples include various services that may be provided to customers such as a messaging service, virtual computer system service, on-demand data storage service, or various other services that may be provided by a computing resource service provider. The computing resource service provider may maintain customer information which the customer may consider private or sensitive. This sensitive information may include credit card number, e-mail address, physical addresses, telephone numbers, contacts, passwords, communications, or any other information a customer may consider private and/or sensitive. Often, these computing resource service providers operate a number of computing resources distributed across multiple networks, and sensitive data may be accessible or stored in a number of locations to facilitate operation of the applications and services provided by the computing resource service provider.

To help safeguard and protect sensitive data, the computing resource service provider may take sensitive data across the distributed environment. Tracking sensitive data may allow the computing resource service provider to mitigate risks, prevent attacks on sensitive data, and take appropriate actions if a host computer system is involved in an attack. Furthermore, the sensitive data may be stored in various data stores such as databases in the distributed environment. During execution of the applications and/or services (e.g., execution of executable code of the applications and/or services by processors in the distributed environment) host computer systems providing the applications and/or services may access data stores containing sensitive data. Certain types of data stores, such as Structured Query Language (SQL) databases, include schemas used to organize data maintained in the database. These schemas may be analyzed to provide an indication of the type of data maintained by the database. For example, the schema may indicate a particular table in the database labeled "customer" including a column labeled "name." Analysis of the schema would therefore indicate that the database contains sensitive data in the form of customer names. However, yet other types of data stores, such as a non-relational (NoSQL) database, do not use schemas but may instead use key/value stores or maps to structure data representation within the database. In such cases it may be useful to analyze source code or other code associated with these databases to detect sensitive data, for example, the structured data representation within a particular database standardized in a software library used to access the particular database.

A code analyzer of the computing resource service provider may perform analysis of source code and/or other code to identify table keys or other information that may be used to generate a schema for these databases. The generated schemas may then be analyzed to detect the presence of sensitive data within these databases. For example, the code analyzer may perform static analysis of application and/or service source code maintained in a code repository. As described in greater detail below, the code analyzer may perform semantic, lexical, and/or pattern matching operations to detect access to a NoSQL database. The code analyzer may then obtain a structured representation, for example, a hash or JavaScript Object Notation (JSON), of data maintained by the database. This may provide an indication of names and/or type of information maintained by the database. This information may then be analyzed against a library of metadata patterns to identify which types of data are being stored, including sensitive data. The result of this analysis may be used to conduct security review processes, trigger additional security controls, alarm on improper use of sensitive data, invoke filtering and/or sanitization of data, provide feedback on better use and/or protection of sensitive data, monitoring of sensitive data, or other action to mitigate risks to sensitive data. For example, this analysis may be used to generate a graph of sensitive data in the distributed environment and any computing resources that may maintain or have access to sensitive data.

In the preceding and following descriptions, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

FIG. 1 illustrates an environment 100 in which a code analyzer 122 may analyze code objects to determine schema information for a data store, the schema information may then be used to detect sensitive data in accordance with an embodiment. A developer 102 may connect through a computer system client device 104 to a code repository 106. The developer 102 may be an organization or an entity of an organization responsible for generating source code or other executable code of applications and services as described above. For example, the developer 102 generates source code for an online marketplace provided by a computing resource service provider. The developer 102 may be a member of a group of developers responsible for generating and maintaining source code or other code for an application and/or service. As described here, the application and/or service may be executed or otherwise implemented by various computing resources in a distributed environment. The computing resources may include physical resources, such as server computer systems and physical data storage devices, as well as virtual resources, such as virtual computer systems and other virtual devices. The computer system client device 104 may include any computing device (physical and/or virtual) which may be used to establish a connection to the code repository 106 and transmit source code over the connection.

The code repository 106 stores and manages source code for the developer 102 or a group of developers. The code repository 106 may be limited to a single software development project or may store and manage source code for a plurality of software development projects. The code repository 106 may be a public code repository such that no credential information or other authentication information is required to access. Alternatively, the code repository 106 may require authentication and/or authorization such that access to the code repository 106 may be limited to one or more particular developers and/or one or more particular software development projects. Furthermore, a particular developer's changes may be considered private developer data and may be managed such that access to the changes and associated developer data is limited. The developers 102 may also trigger and/or cause software builds to be initiated automatically once changes to the software code in the code repository 106 have been pushed to the code repository 106 or manually by generating a request through a management console, described in greater detail below. Compilation artifacts may be delivered securely and efficiently on a storage service offered by the computing resource service provider or directly to the computing resources executing the applications and/or services. Compilation artifacts may include a result from the software build such as executable code, binary file, software library, failure notice, or any other data generated by the a computing resource executing the software build. Furthermore, the compilation artifacts may result from a build of the source code associated with the software development project.

In addition, the developer 102, computer system client device 104, code repository 106, or other computing resource may generate code objects. Code objects may include compilation artifacts as described above or any other data generated based at least in part on source code such as binary code, byte code, hex code, object code, scripting image, or other data object. The code object may also include a set of changes to the source code. For example, the code repository 106 may determine a set of changes made to source code stored by the code repository 106 over an interval of time (e.g., the last 24 hours) and generate a code object corresponding to the set of changes made to the source code. In another example, the computer system client device 104 may generate a code object based at least in part on input from the developer 102 and transmit the code object to the code repository 106. The code repository 106 may maintain versioning information for software development projects maintained by the code repository 106. This may include versioning information for code object as well.

The code objects (e.g., source code generated by the developer 102) may be obtained by the code analyzer 122. The code analyzer 122 may include a variety of computing resources described in greater detail below in connection with FIG. 4. The code analyzer 122 may be a system or service of the computing resource service provider. As described above, the code analyzer 122 may perform various different types of analysis on code objects to detect sensitive data. In one embodiment, the code analyzer 122 may perform analysis of the code object to generate schema information for a database or similar data store. Although static analysis of the code objects is illustrated in FIG. 1 (e.g., obtaining the code object while at rest from a data store such as the code repository 106) other forms of code analysis are considered within the scope of the present disclosure. The code objects may be analyzed during execution, for example, by a web browser, where the code analyzer 122 performs analysis of Asynchronous JavaScript and XML (AJAX) calls to detect sensitive data.

Returning to FIG. 1, the code analyzer 122 may analyze the code objects in a single action or operation or may divide the analysis into a number of steps or phases. Analysis of the code objects by the code analyzer 122 may include a variety of different algorithms and/or mechanisms such as semantic analysis, lexical analysis, regular expressions, pattern matching, machine learning, or any other algorithm or mechanisms suitable for attributes and/or values from the code object. The attributes and/or values may include variable names, table keys, data structures, hashes, metadata, library functions, function calls, application program interface (API) calls, or any other information suitable for detecting sensitive data. Semantic analysis may include various techniques to determine semantic components of natural language understanding. Semantic analysis by the code analyzer 122 may use the definition of segments of words as basic semantic units for semantic models. By performing semantic analysis of the code objects, the code analyzer 122 may determine natural language meaning for various components of the code objects. The natural language meaning may be used to detect sensitive data. For example, a semantic model may be used to match table attributes or variables name of the source code with sensitive data such as customer names or e-mail addresses.

The code analyzer 122 may also perform lexical analysis of the code objects. Lexical analysis may include processing the code objects as a stream of individual characters into a sequence of lexical tokens (e.g., tokenization). For example, the code analyzer 112 may tokenize source code by at least processing the source code as a stream of characters and split the stream into a set of words and a set of symbols (e.g., punctuations). An individual token may include a set of characters consisting of an indivisible set of characters known as lexemes. A lexeme may include the smallest unit of a language that has meaning. The code analyzer 122 may obtain lexemes and categorizes the lexemes according to function which may provide meaning. This process of obtaining lexemes from the code object and categorizing the lexemes according to function and/or meaning may be used to generate a set of tokens.

In addition, the tokens may be stored in a data structure which then may be used by the code analyzer 122 or sensitive data mapping service 116 to detect sensitive data. In various embodiments, symbols, punctuation, and even white spaces may have meaning as tokens and may be used to detect sensitive data. Furthermore, the tokens may be defined by regular expressions. A regular expression (sometimes called a rational expression) is a sequence of characters that define a search pattern, mainly for use in pattern matching with strings or string matching. Each character in a regular expression (that is, each character in the string describing the pattern the regular expression is configured to match) may include a metacharacter (e.g., a character with special meaning) or a regular character (e.g., a character with literal meaning). The metacharacter and regular characters may be used to identify textual material or other information in the code objects of a given pattern, or process a number of instances of the given pattern. Pattern matches can vary from a precise equality to a very general similarity (controlled by the meta-characters). The metacharacter syntax is designed specifically to represent prescribed targets in a concise and flexible way to direct the automation of text processing of a variety of input data, in a form easy to type using a standard ASCII keyboard. For example, metacharacters may include wildcards or other characters to enable more robust pattern matching. The regular expressions may be generated to detect sensitive data, instantiations of NoSQL databases, function calls, API calls, variables, table keys, or any other information associated with sensitive data.

The sensitive data mapping service 116 may receive database schema information or other information from the code analyzer 122. The information received from the code analyzer 122 may be used in a variety of operations to track, manage, and protect sensitive data in the distributed environment. The sensitive data mapping service 116 may be implemented using a variety of computing resources, such as the virtual machine instances described in greater detail below. In one example, the sensitive data mapping service 116 maintains metadata or other information associated with sensitive data and compares and/or matches this maintained information with the database schema information from the code analyzer 122 to detect access to sensitive data by applications and/or service executing the code object analyzed by the code analyzer 122. In another example, the sensitive data mapping service 116 generates a graph or graph representation, described in greater detail below in connection with FIG. 3, indicating computer systems in the distributed environment that may have access to sensitive data or may expose sensitive data if compromised.

Figure 2:
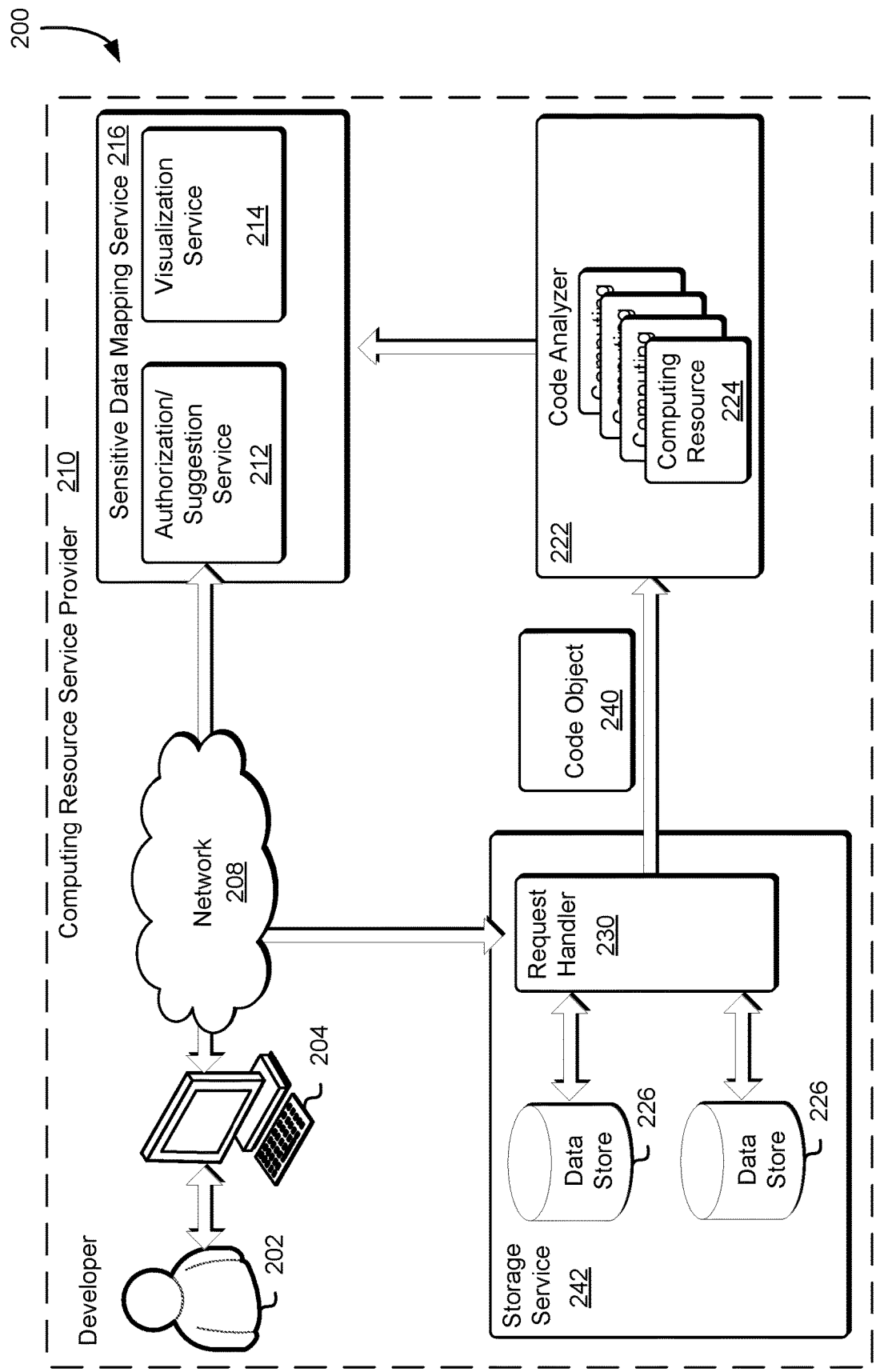
FIG. 2 illustrates an example environment in which a code analyzer may provide a result of analyzed code to a sensitive data mapping service in accordance with an embodiment.

FIG. 2 illustrates an example environment 200 in which code objects 240 may be analyzed to detect risks and/or access to sensitive data maintained by a computing resource service provider 210 in accordance with an embodiment. A developer 202 may connect to a storage service 242 through a computer system client device 204 and a network 208 and may initiate a connection with and/or interaction with one or more computing resources under the control of the storage service 242 or a computing resource service provider 210. The storage service 242 may be operating within the computing resource service provider 210 environment or may be at least partially hosted on resources outside of the computing resource service provider 210 environment. Furthermore, the developer 202 may connect with the storage service 242 in order to manage and control a software development project, for example, using a code repository, as described in greater detail above, hosted by the storage service 242. The storage service 242 may include one or more computing resources under the control of the computing resource service provider 210 and may provide on-demand data storage for customers of the computing resource service provider 210 and/or other services and applications operated by the computing resource service provider 210.

Furthermore, the storage service 242 may synchronously process requests to store and/or access data, such as source code or other code objects generated by the developer 202 as described above. The storage service 242 may operate using computing resources (e.g., databases) that enable the storage service 242 to locate and retrieve data quickly so as to allow data to be provided in response to requests for the data. For example, the storage service 242 may maintain stored data in a manner such that, when a request for a data object is retrieved, the data object can be provided (or streaming of the data object can be initiated) in a response to the request.

As noted, data stored in the storage service 242 may be organized into data objects. The data objects include code objects 240 which may be a particular type of data object associated with a software development project, application, and/or service. The data objects may have arbitrary sizes except, perhaps, for certain constraints on size. Thus, the storage service 242 may store numerous data objects of varying sizes. The storage service 242 may operate as a key value store that associates data objects with identifiers of the data objects which may be used by the developer 202 to retrieve or perform other operations in connection with the data objects stored by the storage service 242. The storage service 242 may contain one or more data stores 226 configured to store data objects as described above. The one or more data stores 226 may be virtual or physical storage devices such as hard disk drives. In order to enable access to data objects stored in the one or more data stores, the storage service 242 may contain a request handler 230. The request handler 230 may maintain the key value store responsible for associating the data objects with identifiers of the data objects. For example, the request handler 230 may receive a request from the computer system client device 204 across the network, including an identifier of a particular data object. The request handler 230 may then retrieve the particular data object based at least in part on the identifier and provide the particular data object in response to the request. The request handler 230 may also provide an interface for processing requests from other services of the computing resource service provider 210. The identifier may be a reference to information configured to provide a location of the data objects (e.g., code objects 240) such as a uniform resource locator (URL) or uniform resource identifier (URI).

For example, as illustrated in FIG. 2, the request handler 230 may provide a particular data object (e.g., code object 240) to the code analyzer 222. The code analyzer 222 may transmit a request such as an API call to the storage service 242 which may be received by the request handler 230 and processed. In one embodiment, the code analyzer 222 sends an API request to the storage service 242 requesting all of the code objects 240 associated with a particular software development project, application, and/or service. The request may be transmitted periodically or aperiodically. In addition, the request may establish a job or workflow that, at the termination of an interval, collects, processes, and/or provides the code objects 240 to the code analyzer 222. For example, the storage service 242 at 12:00 AM every day determines a set of code objects 240 that have been modified the previous day and transmits the set of code objects to the code analyzer 222.

The code analyzer 222 may then instantiate a set of computing resources 224 to process the code object 240. The set of computing resources 224 may include physical and/or virtual computing resources, such as the virtual machine instances described in greater detail below. The set of computing resources 224 may be instantiate upon receipt of the code object 240 or may be maintained by the code analyzer 222. The computing resources 224 may be used to perform semantic analysis, lexical analysis, pattern matching, or other analysis of the code objects. For example, the developer 202 may generate the source code using the computer system client device 204 and transmit the source code to the storage service 242. The source code may provide instructions that, when executed, generate a compilation artifact such as binary code or other executable code. In various embodiments, the compilation artifact in addition to the code object 240 is analyzed by the code analyzer 222.

As described in greater detail below, the code analyzer 222 may perform various different analyses of the code object 240 which may be performed by different computing resources of the set of computing resources 224. For example, a first computing resource of the set of computing resources 224 performs semantic analysis of the code object 240 to determine a set of function calls and/or library calls to schemaless databases (e.g., NoSQL databases) and then a second computing resource of the set of computing resources 224 uses lexical analysis to determine a set of attributes and/or table keys associated with the function calls and/or library calls to schemaless databases. In yet other embodiments, a third computing resource of the set of computing resources 224 uses regular expressions to perform pattern matching on the set of attributes and/or table keys to detect sensitive data associated with the set of attributes and/or table keys. For example, the third computing resources may use a regular expression to detect various strings, text blocks, and/or values such as "customer name," "credit card number," "customer address," or other information that is associated with sensitive data in the set of attributes and/or table keys. These regular expressions may be pregenerated by a user of the code analyzer 222, generated by an algorithm (e.g., machine learning), or a combination of user generated and computer generated.

A sensitive data mapping service 216 may be provided with information generated by the code analyzer 222. The sensitive data mapping service 216 may include additional services and/or micro-services such as an authorization and suggestions service 212 and a visualization service 214. The sensitive data mapping service 216, the authorization and suggestions service 212, and the visualization service 214 are services implemented by the computing resource service provider 210 using computing resources as described herein to detect sensitive data in the computing resource service provider environment and protect sensitive data. As described above, the sensitive data mapping service 216 may utilize database schema information obtained from the code analyzer 222 to detect applications and/or services of the computing resource service provider 210 that have access to or may expose sensitive data.

Furthermore, the authorization and suggestions service 212 may, as a result of the sensitive data mapping service 216 detecting sensitive data, require authorization of the developer 202 and/or the application accessing the sensitive data. In yet other embodiments, the authorization and suggestions service 212 provides suggestions for ensuring sensitive data accessed by the application and/or service is not exposed. For example, the authorization and suggestions service 212 may transmit a suggestion to the developer 202 indicating a secure data source for creating, reading, updating, and/or deleting sensitive data. The authorization and suggestions service 212 may also modify the code object 240 to protect sensitive data. For example, the authorization and suggestions service 212 may delete sensitive data table keys from a database utilized by the application and/or service.

The visualization service 214 may generate a graph of the computing resource service provider environment as described below. The graph may indicate locations of sensitive data and computer systems which may have access to sensitive data. Furthermore, the graph may be used to trace or determine transmission of sensitive data within an application and/or service or between applications and/or services. The graph may be an example of a graphical representation of data which may aid in visualization of various resources in a distributed environment as well as the presence and use of sensitive data in the distributed environment.

Figure 3:
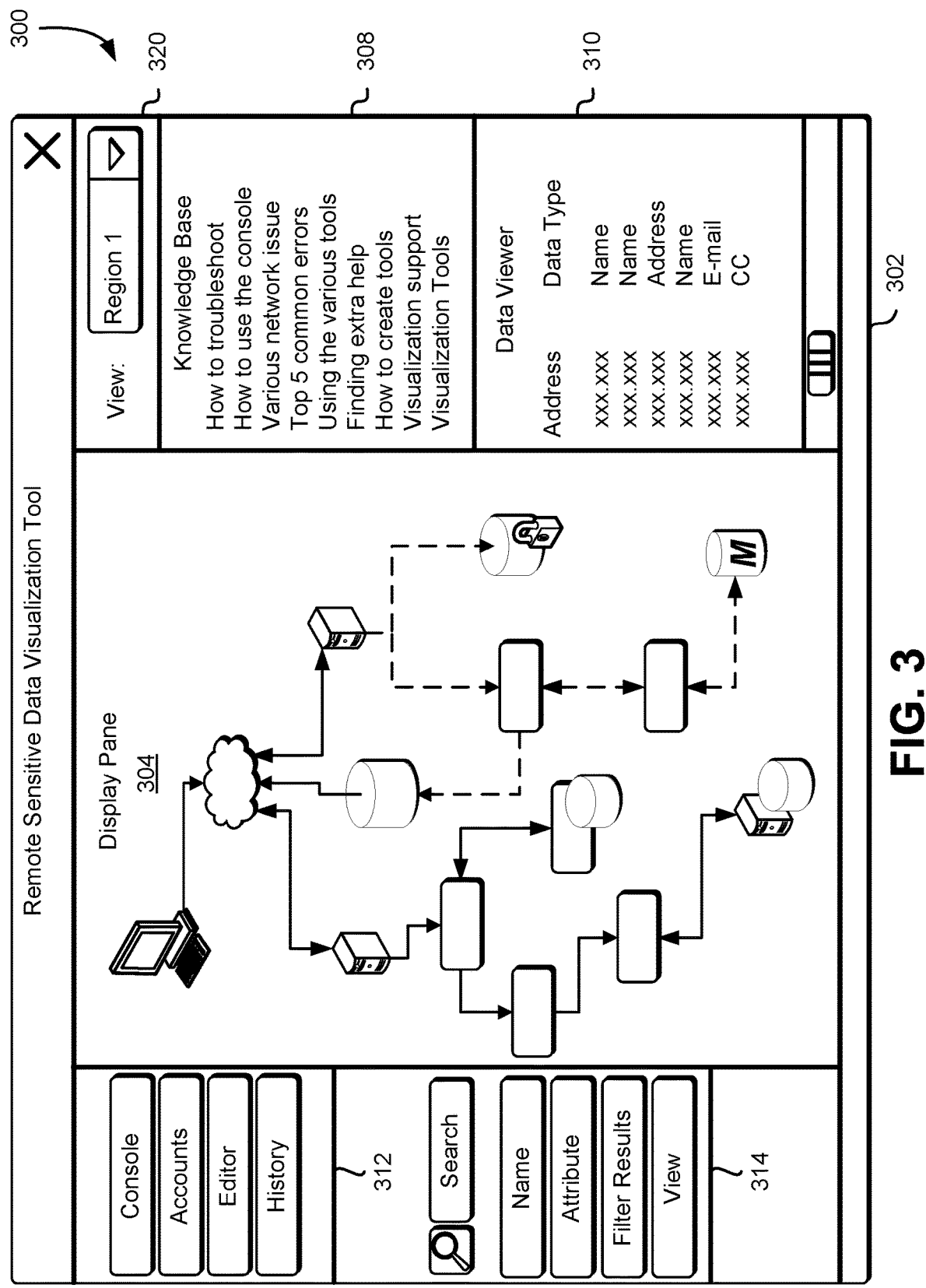
FIG. 3 illustrates an example environment where a remote sensitive data visualization tool may be used to display information associated with a distributed computing resource environment in accordance with an embodiment.

FIG. 3 illustrates an example environment 300 where a remote sensitive data visualization tool 302 may be used to display sensitive data (e.g., at rest in a data store or accessible by a host) as described herein at least in connection with FIG. 1 and in accordance with at least one embodiment. The remote sensitive data visualization tool 302 may be configured to enable troubleshooting issues associated with customer sensitive data, receive recommendations associated with sensitive data, search a knowledge base for information related to sensitive data, view risks to sensitive data, generated graphs of sensitive data in a distributed computing environment, and generally provide mechanisms for detecting, tracing, and protecting sensitive data. The remote sensitive data visualization tool 302 may be configured as a computer service such as a web service and may be provided as a service by the computing resource service provider, for example, as a sensitive data mapping service, as described herein at least in connection with FIG. 1.

The remote sensitive data visualization tool 302 may be provided as a user interface executed by an application such as a web browser executing on a computer system operated by the technician, developer, administrator and/or other user of the computing resource service provider, as well as other user interfaces that may be used to present information associated with sensitive data and may, in some embodiments, be generated by the computing resource service provider and sent to a user's display for rendering. In other embodiments, the user's computing device may include functionality to generate some or all portions of the user interface. For example, the user's web browser may include code for generating some of the graphics for rendering data received from the computing resource service provider. The service provider may also receive the selection information from the user's computing device and provide the requested information. The user interface may be generated or caused to be generated by the sensitive data mapping service as described herein.

The remote sensitive data visualization tool 302 may include diagnostic tools (not shown in FIG. 3 for simplicity) to perform various diagnostic tasks as described herein and visualization of sensitive data in the remote sensitive data visualization tool 302. For example, the diagnostic tools may include a graphical user interface element, such as the buttons, where selection of the graphical user interface element may cause the sensitive data mapping service to execute a particular task associated with the selected graphical user element. For example, the sensitive data mapping service may generate a graph to be displayed in a display pane 304 of the remote sensitive data visualization tool 302. In another example, the sensitive data mapping service may return information corresponding to a set of computer systems in the distributed computing environment which may expose sensitive data if attacked as well as information corresponding to applications and/or services associated with the set of computer systems.

The remote sensitive data visualization tool 302 may produce the graphical representation of sensitive data in the distributed environment to be displayed in the display pane 304 based at least in part on computing resources provided by the computing resource service provider and a result of analyzing code objects executed by the computing resources. For example, a code analyzer, as described above, obtains code objects associated with the computing resources and perform various different analyses of the code object to generate a schema associated with one or more schemaless databases utilized by the computing resources. The analysis may include several iterations or phases of analysis, which may include semantic analysis, lexical analysis, pattern matching, other analysis of the code object, or a combination.

The schema information provided by the code analyzer is then used to detect sensitive data in the distributed computing environment. For example, the schema information may indicate table keys or other attributes of a particular database in the distributed environment. A particular table key may match known metadata associated with customer names (e.g., a regular expression used to detect customer name sensitive data). This may indicate that the particular database contains sensitive data.

The graphical representation of sensitive data in the distributed environment as displayed in the display pane 304 may be displayed using block diagrams, generated images, or visualization elements and may, in some embodiments, include one or more icons. In addition, as illustrated in FIG. 3, connections and/or exposure of sensitive data may be indicated by a dotted line between computing resources. Other display features may be used to illustrate sensitive data in the graph. For example, the color red may be used to highlight or otherwise set apart computing resources with sensitive data and/or access to sensitive data. In another example, particular icons may be used for sensitive data or particular icons may be used for different type of sensitive data, such as for customer names, addresses, or payment information.

The remote sensitive data visualization tool 302 may include a set of options 312 used to perform various functions in connection with the remote sensitive data visualization tool 302. The set of options 312 may be a set of functions included in the remote sensitive data visualization tool 302 that enables a user to perform a variety of operations such as managing accounts, creating graphs, and managing computing resources. The options 312 may be configured as graphical user interface elements of the remote sensitive data visualization tool 302.

The remote sensitive data visualization tool 302 may include a search feature 314 enabling the user to search for sensitive data in the graph. Searching the graph using the search feature 314 may return a set of results at least partially matching a search query and/or string provided by the user through the graphical user interface of the remote sensitive data visualization tool 302. The user may enter a search query in a graphical user interface element such as a text box or other input region included in the search feature 314. The user may then select the search button, illustrated in FIG. 3 as a magnifying glass, selection of which may cause the remote sensitive data visualization tool 302 to navigate to another page and/or modify the display pane 304 to display search results. Furthermore, the user, using the search features 314, may search names, attributes, values, or other information contained in metadata obtained by the code analyzer and/or the schemas generated by the code analyzer. The user may also filter search results based at least in part on computing resources, data type, different view or portion of the graph, or other attributes of the results. For example, the user may search an attribute and provide the string "credit card number," the user may then filter the results to search for integers or numeric values. In addition, the remote sensitive data visualization tool 302 may have a button to enable the user to change the view of the graph displayed in the display pane 304. For example, the view button 320 may enable the user to zoom in, zoom out, change the type of graph, view additional information in the display plane (e.g., data input and outputs of the computing resources included in the graph), change to a table view, or other modifications to the display pane 304 to enable the user to visualize sensitive data in the computing environment.

The account button may be configured to enable the user to select particular accounts (e.g., applications or services) to analyze, detect, and/or monitor for sensitive data. In various embodiments, the customer operating the remote sensitive data visualization tool 302 is required to have, at the minimum, complete read permissions across all of the customer services and computing resources associated with the accounts the user is attempting to perform operations in connection with. The editor button may be configured to enable the user to create custom analysis, detection, and/or monitoring tasks in the task editor tab (not shown in FIG. 3 for simplicity).

In various embodiments, the user is provided with resources to aid in the creation and editing of tasks. Once created, the user may cause the tasks to be executed to confirm there are no errors and save the task for later use. The tasks may be saved in such a manner that they are accessible to all users, including users associated with other services, of the computing resource service provider. The task may also be submitted to the computing resource service provider for review and approval and, after review, if the task is found to be unique and of good quality, it may be published to all users and used as a support tool. For example, a particular task may include obtaining a set of changes to source code associated with an application, detecting sensitive data based at least in part on an analysis of the source code, and updating the graph based at least in part on computing resources with access to the source code.

The remote sensitive data visualization tool 302 may further include an data viewer 310. The event viewer may be configured to provide information related to sensitive data associated with applications, services, and/or particular computing resources thereof. This information may provide a set of data associated sensitive data and types of sensitive data stored or accessible to particular computing resources. The information displayed in the data viewer 310 may be generated automatically or in response to generating of the graph displayed in the display pane 304. The remote sensitive data visualization tool 302 may also include a knowledge base 308 that includes articles and provides access to curated content based at least in part on the information collected from users of the computing resource service provider. The knowledge base may include suggestions on remedial actions for leaks of sensitive data, actions for protecting sensitive data, risks to sensitive data, impact of host impairment on sensitive data, authorization for access to sensitive data, or other information that may be useful to the user.

Figure 4:
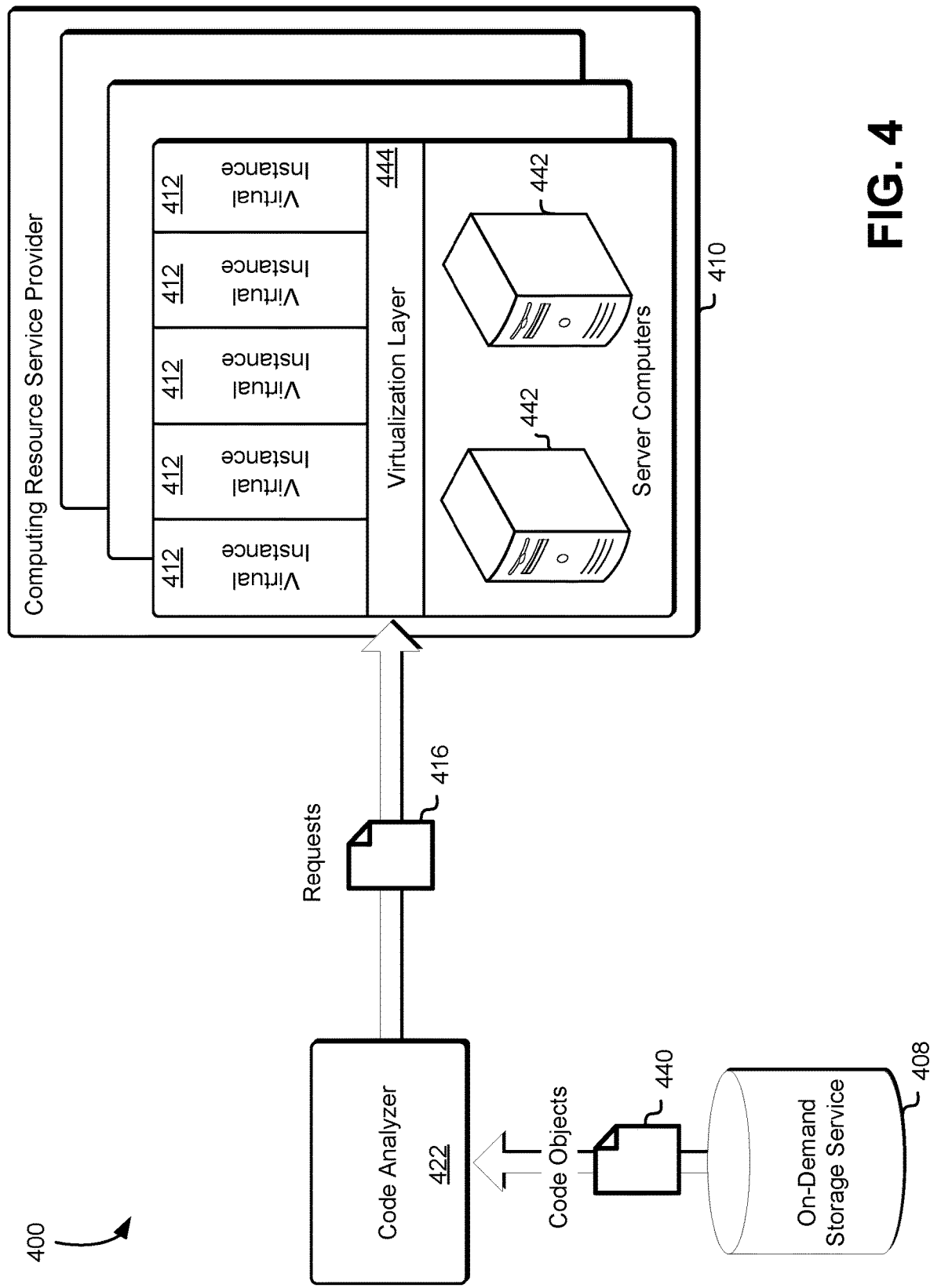
FIG. 4 illustrates an example environment in which a code analyzer may obtain code objects and use computing resources of a computing resource service provider to perform analysis to detect potential risks to sensitive data in accordance with an embodiment.

FIG. 4 illustrates an environment 400 in which a code analyzer 422 of a computing resource service provider 410 may obtain code objects 440 in accordance with at least one embodiment. The code analyzer 422, which may be implemented by physical hardware, is used by the computing resource service provider 410 to detect sensitive data based at least in part on source code or other code objects associated with applications and/or other services of the computing resource service provider 410. For example, the code analyzer may generate schema information based at least in part on attributes included in a particular code object. The code analyzer 422 may include a group of computing systems, such as the server computers 442 described in detail below, configured to generate schema information based at least in part on code objects 440 obtained from an on-demand data storage service 408. The on-demand storage service may include a code repository or other storage devices as described above.

The physical hardware may include a server computer 442. The server computer 442 may be any device or equipment configured to execute instructions for performing data computation, manipulation, or storage tasks, such as a computer or a server. A server computer 442 may be equipped with any needed processing capability including one or more processors, such as a central processing unit (CPU), a graphics processing unit (GPU) or a digital signal processor (DSP), memory, including static and dynamic memory, buses and input and output ports that are compliant with any handshaking, communications, or data transfer protocol. The physical hardware may also include storage devices, such as block-level storage devices, storage disks and tapes, networking equipment, and the like.

A virtualization layer 444 may include a bare metal hypervisor or a hosted hypervisor. The virtualization layer 444 executing on the server computer 442 enables the physical hardware to be used to provide computational resources upon which one or more virtual computer system instances 412 or other computing resources may operate. For example, the virtualization layer 444 enables a particular virtual computer system instance to access physical hardware on the server computer 442 through virtual device drivers or other executable code on the virtual computer system instance 412. In another example, a block-level storage device can be virtualized and provided to the virtual computer system instance 412 through a virtual device driver. The virtualization layer 444 may include a hypervisor or virtualization software and/or hardware. The virtualization layer 444 may also include an instance of an operating system dedicated to administering the virtual computer system instance 412 or other computing resource executing on the server computer 442. In addition, the virtualization layer 444 may include software or other executable code that records the operation of the virtual computer system instances 412 and/or events of the virtual computer system instances 412. Each virtualization layer 444 may include its own networking software stack responsible for communication with other virtualization layers 444 and, at least in some embodiments, also responsible for implementing network connectivity between the virtual computer system instance 412 or other computing resources executing on the server computer 442 and virtual computer system instance 412 or computing resources executing on other server computers 442.

Furthermore, the server computer 442 may host multiple virtualization layers 444 of the same or different types on the same server computer 442 as well as virtual computer system instances 412 of the same or different types. For example, a server computer 442 may host a first virtual computer system instance instantiated from a first volume image and operated by a first customer and may host a second virtual computer system instance instantiated from a second volume image that is operated by a second customer. The customer may include applications and/or services of the computing resource service provider 410. For example, as described in greater detail below, the code analyzer 422, which is a service of the computing resource service provider 410, transmits a request to the virtual computer system instance 412, through the virtualization layer 444 to execute various requests. The requests 416 may include a request to process and/or analyze code objects 440 as described in greater detail below.

The virtualization layer 444 may be any device, software, or firmware used for providing a virtual computing platform and/or virtualized computing resources for the virtual computer system instance 412 and/or component thereof. The virtual computing platform may include various virtual computer components, such as one or more virtual CPUs, virtual memory, virtual disk storage, and the like. The virtual computer system instance 412 may be provided to the customers or other services of the computing resource service provider 410 and the customers may utilize the virtual computer system instance 412 or components thereof. Further, the computing resource service provider 410 may use one or more of its own virtual computer system instances for supporting execution of its applications and providing computing resources for such applications.

Commands and other information may be included in an (API) call from the code analyzer 422 or the on-demand data storage service 408 to or from the virtualization layer 444. The code analyzer 422 enables the technicians, users, and other services of the computing resource service provider 410 to detect sensitive data and/or provide information which may be used to detect sensitive data in a distributed computing environment provided by the computing resource service provider 410. For example, the code objects 440 are generated by a developer and stored in a code repository for a software development project as described above. The code analyzer 422 then obtains the code objects 440 from the code repository and transmits requests 416, including the code objects 440, to the virtual computer system instances 412 to analyze the code objects 440.

The request may be an API call including information corresponding to the software development project, code objects 440, the on-demand data storage service 408, the code analyzer 422, and/or a particular virtual computer system instance. In some embodiments, the code analyzer 422 may determine a corresponding virtualization layer 444 for execution of the request 416 by the virtual computer system instance 412 and transmit a command to the virtualization layer 444 to the code objects 440 corresponding to the request 416. In another example, the code analyzer 422 distributes requests 416 to various virtual machine instances, the requests corresponding to different operations involved in analyzing the code objects 440.

In various embodiments, the code objects 440 may be stored in multiple locations for the purpose of durability. Furthermore, the code objects 440 may include modification or changes to a software development project or particular code object since a previous point in time when the software development project or particular code object was stored or otherwise persisted. For example, the on-demand data storage service 408 or another component of the computing resource service provider 410 may generate code objects 440 based at least in part on the portion of the software development project or particular code object that has been modified since the last command to store the particular code object. The process of determining changes to a particular code object, such as source code, may be an operation of the code repository as described above.

The on-demand data storage service 408 may be a data warehouse or a non-queryable data storage system. A data storage system and/or data storage device is queryable if the data storage system and/or data storage device enables requestors to submit data queries and receive response to the submitted data queries. For example, the on-demand data storage service 408 may include a database, such as an Structured Query Language (SQL) database, which enables the customer, the impairment detection service, or other services of the computing resource service provider 410 to query the on-demand data storage service 408 for information contained in or associated with the code objects 440 and stored by the on-demand data storage service 408. In another example, the on-demand data storage service 408 may be non-queryable insomuch as the on-demand data storage service 408 stores code objects (e.g., source code data objects) as data objects which are obtainable by a data object identifier, such as a file name or key, but does not enable queries on information contained in the on-demand data storage service 408.

The on-demand data storage service 408 may be a collection of computing resources configured to synchronously process requests to store and/or access data. The on-demand data storage service 408 may operate using computing resources (e.g., databases) that enable the on-demand data storage service 408 to locate and retrieve data quickly to allow data to be provided in response to requests for the data. For example, the on-demand data storage service 408 may maintain stored data in a manner such that, when a request for a data object is retrieved, the data object can be provided (or streaming of the data object can be initiated) in a response to the request. As noted, data stored in the on-demand data storage service 408 may be organized into data objects. The data objects may have arbitrary sizes except, perhaps, for certain constraints on size. Thus, the on-demand data storage service 408 may store numerous data objects of varying sizes. The on-demand data storage service 408 may operate as a key value store that associates data objects with identifiers of the data objects that may be used by the customer to retrieve or perform other operations in connection with the data objects stored by the on-demand data storage service 408.

In other embodiments, the requests 416 to process and/or analyze code objects 440 are requests to launch tasks transmitted over a network to a container service (not illustrated in FIG. 5 for simplicity) of a computing resource service provider 410. A scheduler may determine into which container instance of a cluster of container instances that the requests 416 to process and/or analyze code objects 440 are to be completed. In some embodiments, a single container instance may be instantiated per action or operation of the requests 416. Alternatively, the computing resource service provider 410 may provide a fleet or cluster of container instances to perform one or more actions and/or operations of the requests 416. The cluster 76 of container instances may include multiple Internet Protocol (IP) addresses and a Network address translation (NAT) gateway configured to route traffic to the IP addresses.

In some examples, a "task definition" or "task definition file" may refer to a file specifying a set of linked containers (i.e., a set of containers that, when running on a host computing system, are associated with each other) that are assigned to start as a group. The task definition may further specify disk and network locations that the software functions are able to share on a single physical machine. The task definition may then be utilized for launching the set of container instances. In some implementations, the task definition may define and link software functions spread across multiple physical machines. One task definition may contain and schedule many tasks. In some examples, a "task" may refer to an instantiation of a patch workflow, and may consist of one or more software functions. Tasks may be modified by applying a new task definition to the task.

The requests 416 may contain all the information needed to place software functions in container instances of a cluster, and the cluster may be managed through application programming interface calls. This information may be provided as parameters to the requests 416. An example task definition specifies that one or more tasks with a given name have a software image located at a particular patch. Furthermore, the task definition may allocate processing capacity, memory, IP address, port, and other computing resources to particular tasks of the one or more tasks. Similarly, the task definition may also specify storage locations for data objects to be processed and data objects that may be created as a result of execution of the software functions, such as the on-demand storage 408 illustrated in FIG. 4. In various embodiments, the task definition indicates an interaction between tasks and/or software functions. For example, a particular task definition indicates that a first task obtains a code object 440 and a second task analyzes the code object 440 as described above. Each task described above may have a software function associated with the task and may be executed by the same or different container instances.

Figure 5:
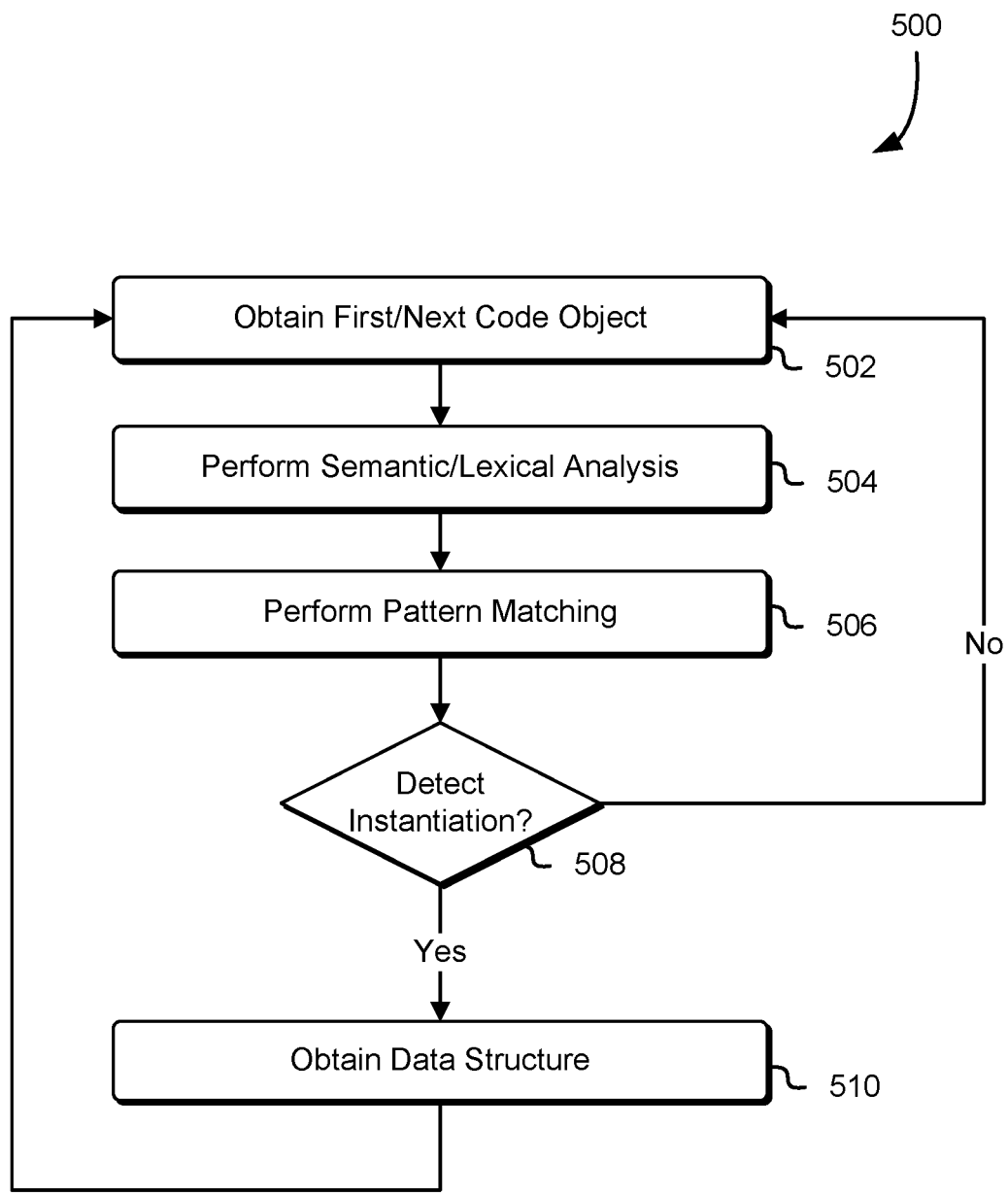
FIG. 5 illustrates an example process for detecting database access in a code object in accordance with an embodiment.

FIG. 5 shows an illustrative process 500 which may be used to detect instantiation and/or access to one or more schemaless databases and obtain information associated with the one or more schemaless databases in accordance with at least one embodiment. The process 500 may be performed by any suitable system such as the code analyzer described above in FIG. 1 or any combination of systems or components thereof such as the sensitive data mapping service. Returning to FIG. 5, in an embodiment, the process 500 includes obtaining a code object 502. The code object may include source code, byte code, binary code, or other executable code which may be generated by a developer or based at least in part on information provided by a developer. For example, the code object may include a compilation artifact generated based at least in part on source code generated by a developer as described above. The code object may be stored in a data store such as a code repository or on-demand data storage service as described above.

The code analyzer may then perform semantic and/or lexical analysis of the code object 504. Lexical analysis of the code object may include an initial processing of code object to remove various formatting elements such as brackets, parentheses, white spaces, comments, or otherwise generate a set of tokens (e.g., tokenization) based at least in part on the code object. The code analyzer may also perform semantic analysis to determine a natural language meaning associated with one or more tokens included in the set of tokens. In addition, the semantic and/or lexical analysis may be used to detect information associated with schemaless databases. For example, the code analyzer may use semantic and/or lexical analysis to detect the use of particular software development kits (SDKs) associated with schemaless databases used by the developer. For example, the code object may include one or more API calls or other libraries functions that provide an interface for a particular programming language and/or particular hardware that is capable of communicating with an instantiation of a particular schemaless database. Various techniques for semantic and/or lexical analysis are described in "Jumping NLP Curves: A Review of Natural Language Processing Research" by Cambria, Erik; White, Bebo (2014), hereby incorporated by reference in its entirety herein.

The code analyzer may then perform pattern matching operations 506. The code analyzer may use pattern matching to detect method names, class names, functions, API calls, or other information included in the code object to detect use of a schemaless database and a particular type of schemaless data base used. For example, the code analyzer may use regular expressions to search the code object for particular functions and/or operations associated with the schemaless databases. The operations may include various different operations such as create, read, update, and delete operations. The code analyzer may then determine, based at least in part on the semantic and/or lexical analysis and a result of the pattern matching operations, whether the code includes an instantiation of a schemaless database 508. An instantiation of a schemaless database may include the use on any NoSQL database by an application and/or service implemented as a result of executing the code object.

If an instantiation is detected, the code analyzer may obtain a data structure associated with the schemaless database 510. The data structure may include a JSON, hash, or other data structure used to provide data to be stored by the schemaless database. For example, the data structure may be a table including table keys and corresponding values. In another example, the data structure may be a set of attribute-value pairs. The data structure may include information (e.g., attribute names) that may indicate the presence of sensitive data in the database. If no instantiation is detected, the code analyzer may return to step 502 and obtain the next code object and continue processing code objects for indications of sensitive data. The set of code objects may include all of the code objects of one or more software development projects or may include only a subset of all the code objects of the one or more software development projects.

Figure 6:
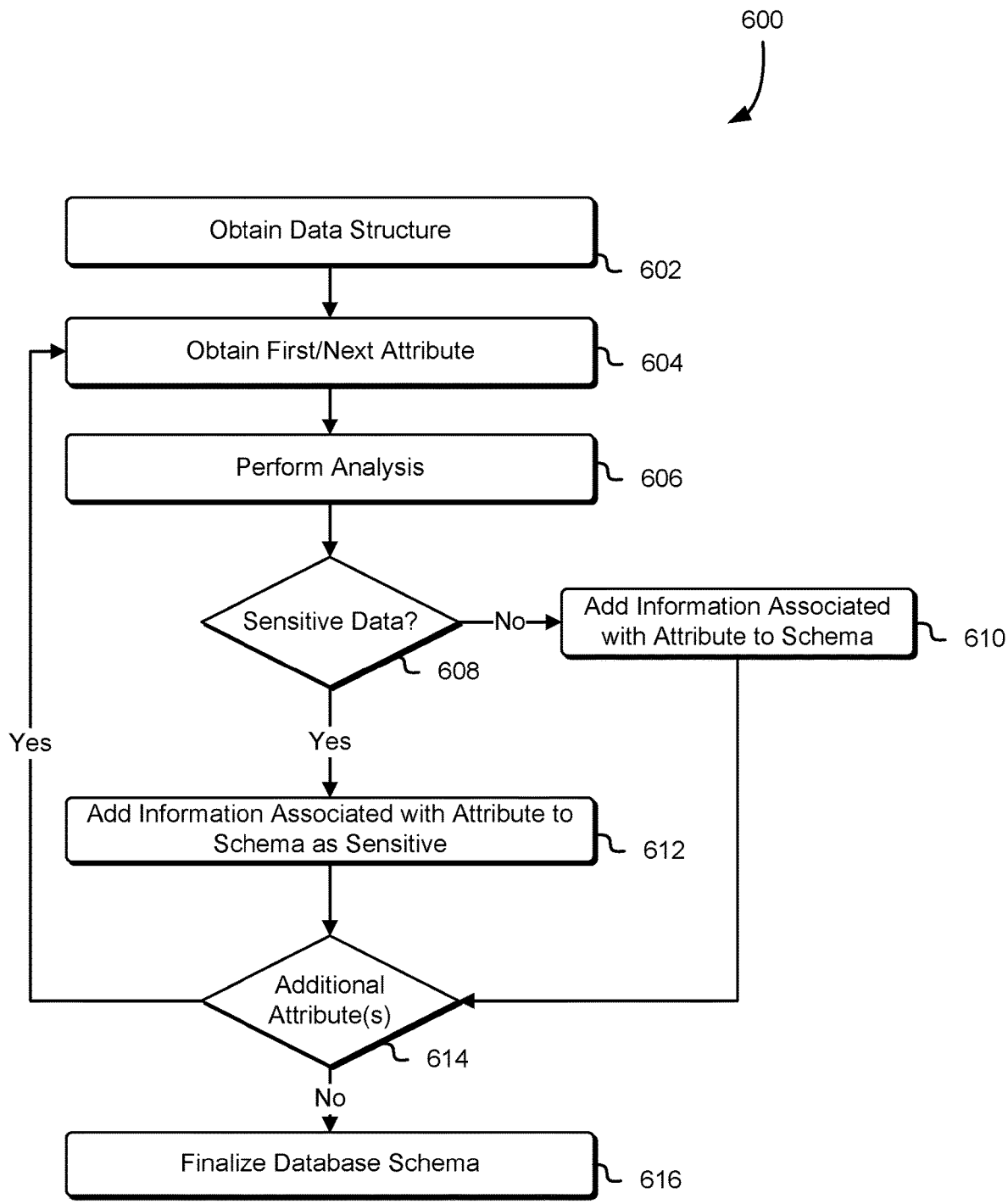
FIG. 6 illustrates an example process for generating a database schema in accordance with an embodiment.

FIG. 6 shows an illustrative process 600, which may be used to determine a database schema based at least in part on information provided by analyzing code objects in accordance with at least one embodiment. The process 600 may be performed by any suitable system such as the code analyzer described above in FIG. 1 or any combination of systems or components thereof, including the sensitive data mapping service. Returning to FIG. 6, in an embodiment, the process 600 includes obtaining a data structure 602. The data structure may be a data structure as described above including data structures for providing data (including request to read and update data) to a database. For example, the data structure may include a JSON defining attribute-value pairs for storage in a particular database.

The code analyzer may then obtain the first/next attribute 604 from the data structure. Returning to the example above, the code analyzer may obtain an attribute from the JSON and the attribute may indicate a name associated with the value in the attribute-value pair. Other attributes may include keys or information used by the developer to provide semantic meaning to a particular value or set of values, such as a row or column in a database. For example, the attribute may be a string of characters (e.g., 'credit card number') used to provide meaning to information stored in the database. The code analyzer may then perform analysis of the attribute 606. Analysis of the attribute may include semantic analysis, lexical analysis, pattern matching, or other analysis as described herein. For example, the code analyzer may use regular expressions generated based at least in part on metadata associated with sensitive data to analyze the attribute.

The code analyzer may then determine if the attribute is associated with sensitive data 608. If the code analyzer determines the attribute is not associated with sensitive data, information associated with the attribute may be added to the schema for the database 610. However, if as a result of the analysis, the code analyzer determines the attribute is associated with sensitive data, information associated with the attribute may be added to the schema as sensitive 612. For example, if the attribute indicates the values stored by the database include customer names, the code analyzer may store, in the schema, an entry indicating that customer names are stored in the database and customer names include sensitive data. In addition, detecting sensitive data may include analysis of multiple data point (e.g., attributes, values, or other data included in the data structure or code object). For example, a first attribute may correspond to customer orders and a rule associated with the customer orders may indicate that the first attribute is associated with sensitive data (or the rule may indicate a score to be assigned to the attribute described in greater detail below). A second attribute may correspond to customer names, the combination of the first attribute and second attribute may indicate sensitive data or may indicate a higher level of sensitivity (e.g., may cause an increase to an overall score).

The code analyzer may then determine if there are additional attributes included in the data structure 614. In there are additional attributes, the code analyzer may return to step 604 and obtain the next attribute. If there are no additional attributes, the code analyzer may finalize the database schema 616. Finalizing the database schema may include performing additional analysis to determine if there is additional sensitivity and/or a high level of sensitivity as a result of a combination of two or more attributes. As described above, a combination of attributes, values, or other data included in the data structure or code object may indicate sensitive data or an increased sensitivity level. For example, the presence of customer name and customer address may cause the system executing the process 600 to determine additional sensitivity associated with the database schema.

In numerous variations of the process 600, a score or weight may be assigned to attributes and sensitive data is detected based at least in part on the score and/or an overall sensitivity or sensitivity level is determined based at least in part on the score. For example, a first attribute associated with customer names may be given a first score or value and a second attribute associated with items for sale may be given a second score or value. Sensitive data and/or a sensitivity level may then be determined based at least at part on a total score of the attributes in the database schema. In addition, a confidence score or level may be associated with individual scores or overall scores for the database schema. For example, historical data may be examined to determine the success of various rules, scores, weights, or other data used to determine sensitive data and/or sensitivity level associated with database schemas. In yet other variations of the process 600, they may include in the database schema all attributes in the database without determining if the attributes are associated with sensitive data. In these variations of the process 600, a determination of whether the database includes sensitive data may performed after the database schema is completed and provided to a sensitive data mapping service as described above.

Figure 7:
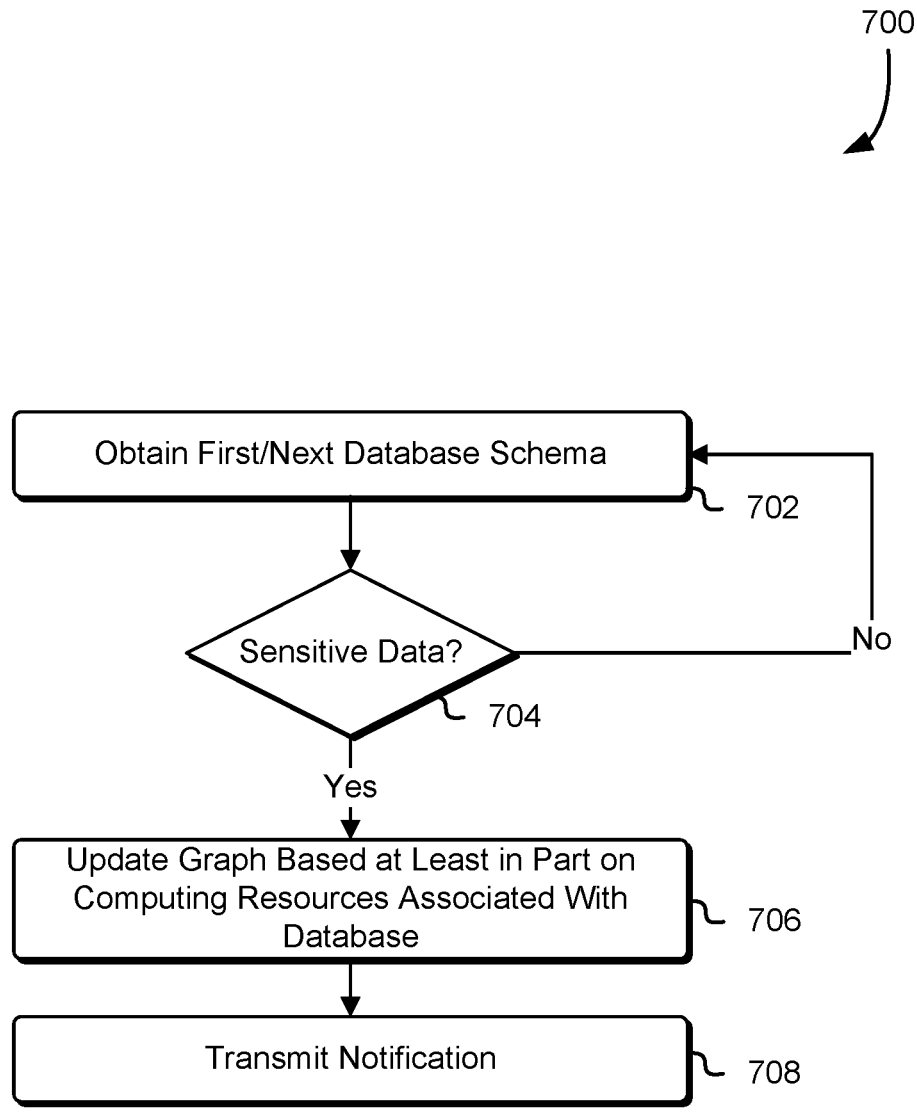
FIG. 7 illustrates an example process for monitoring risks to sensitive data in accordance with an embodiment.

FIG. 7 shows an illustrative process 700 which may be used to determine locations and risks to sensitive data in a distributed computing environment in accordance with at least one embodiment. The process 700 may be performed by any suitable system such as the sensitive data mapping service described above in FIG. 1 or any combination of systems or components thereof. Returning to FIG. 7, in an embodiment, the process 700 includes obtaining a first/next database schema 702. The database schemas may be generated by a code analyzer based at least in part on analysis of code objects as described above. The database schema may indicate a set of attributes stored in a schemaless database. The attributes may indicate types of information maintained in the database.

The sensitive data mapping service may then determine if the database schema includes sensitive data 704. For example, sensitive data mapping service may compare the data schema to data schemas known to include sensitive data. The sensitive data mapping service may also compare metadata associated with sensitive data to determine if the database schema includes sensitive data. Yet other mechanisms for detecting that the attribute is associated with sensitive data include various techniques, such as semantic analysis, lexical analysis, or pattern matching as described above. If the database schema does not include sensitive data, the sensitive data mapping service may obtain the next database schema. However, if the database schema includes sensitive data (e.g., one or more attributes included in the database schema indicate sensitive data), the sensitive data mapping service may update a graph based at least in part on computing resources associated with the database 706.

The computing resources associated with the database may include computing resources implementing the database or computing resources executing code object analyzed to generate the database schema determined to include sensitive data. The graph may include computing resources, connections between computing resources, and other information about the distributed computing environment as described above in connection with FIG. 3. The sensitive data mapping service may then transmit a notification 708. The notification may include a variety of notifications and information. For example, the notification may include the graph indicating sensitive data in the distributed computing environment. In another example, the notification may be transmitted to a developer associated with the code object analyzed to generate the database schema determined to include sensitive data. The notification may include information indicating a more secure source or means of accessing the sensitive data, an authorization request for accessing the sensitive data, or other information associated with the sensitive data. In numerous variations to the process 700, other operations may be performed in addition or instead of transmitting the notification. For example, the system performing the process 700 may revoke access to sensitive data or initiate a security review process for the application utilizing sensitive data.

Figure 8:
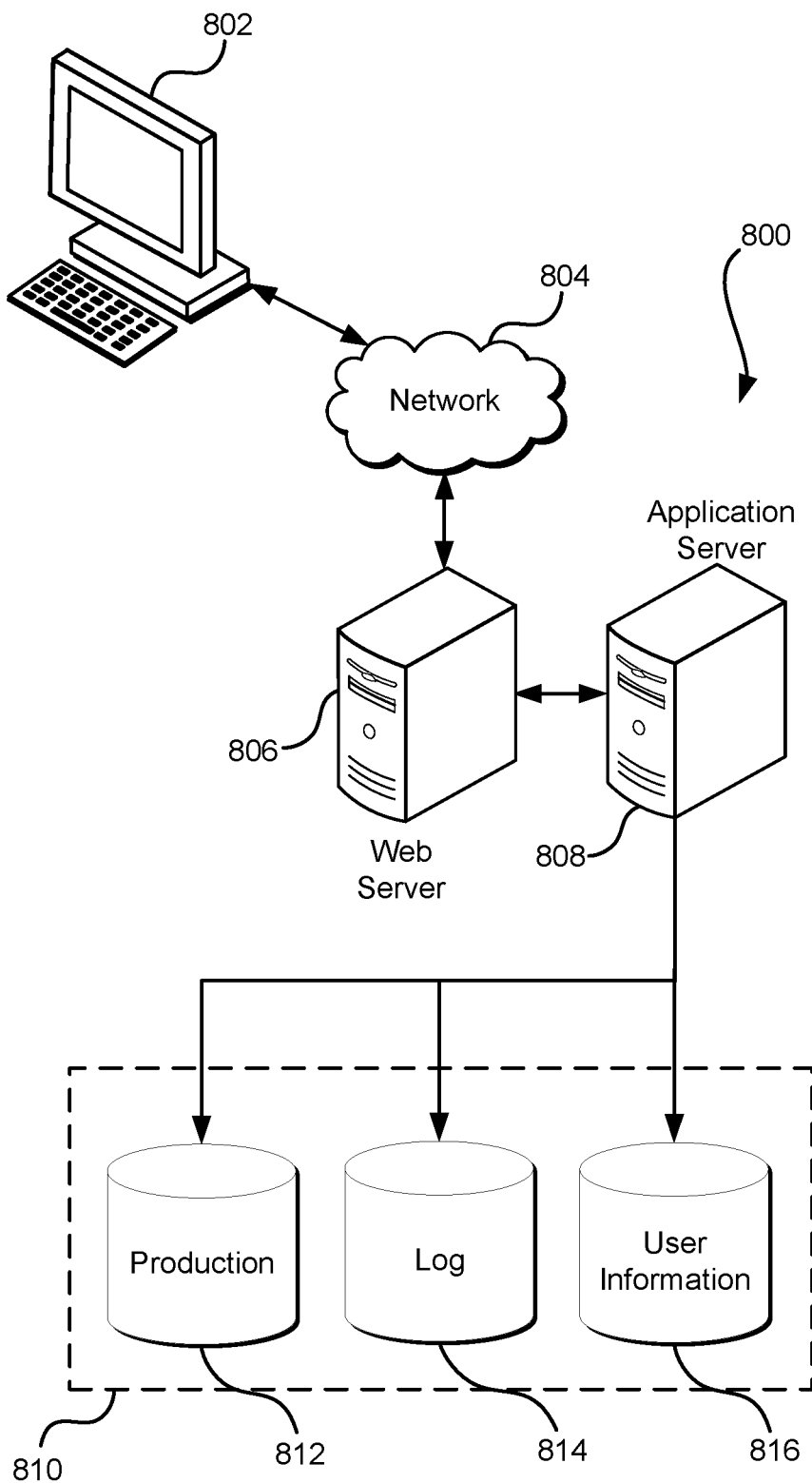
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages, or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("C S S"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 802 and the application server 808, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes, and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    obtaining source code from a data store, the source code associated with a software development project;
    detecting code whose execution results in a create, read, update, or delete operation to be performed in a schemaless database by at least performing lexical analysis of the source code for indication of an operation associated with the schemaless database;
    as a result of detecting code, obtaining a data structure included in the operation;
    generating a schema associated with the schemaless database by at least obtaining a set of attributes from the data structure;
    detecting sensitive data maintained in the schemaless database based at least in part on the schema; and
    providing an indication of a location of the sensitive data.

2. The computer-implemented method of claim 1, wherein the computer-implemented method further comprises updating a graph based at least in part on detecting sensitive data, the graph indicating locations from which sensitive data is accessible in a distributed computing environment.

3. The computer-implemented method of claim 1, wherein detecting sensitive data further comprises detecting sensitive data based at least in part on a result of pattern matching the set of attributes included in the schema.

4. The computer-implemented method of claim 1, wherein detecting code further comprises performing semantic analysis of the source code for indications of the schemaless database.

5. A system, comprising:
    at least one computing device implementing one or more services, wherein the one or more services:
        obtain a set of code objects from a data store, the set of code objects associated with one or more applications executed in a distributed computing environment;
        generate a set of schemas associated with one or more schemaless databases utilized by the one or more applications by at least:
            detecting a set of operations associated with the one or more schemaless databases based at least in part on performing lexical analysis on the set of code objects, wherein the set of operations comprises at least one of a create, read, update, or delete operation on the one or more schemaless databases; and
            obtaining a set of attributes from data structures associated with the set of operations;
        detect sensitive data maintained in the one or more schemaless databases based at least in part on the set of schemas; and
        provide a notification indicative of a location of the sensitive data.

6. The system of claim 5, wherein the one or more services further comprise transmitting a notification to a client device operated by a developer associated with a code object of the set of code objects for which sensitive data was detected, the notification indicating a risk to sensitive data.

7. The system of claim 5, wherein generating the set of schemas further comprises generating a set of lexical tokens based at least in part on the set of code objects, each lexical token of the set of lexical tokens including a set of lexemes.

8. The system of claim 5, wherein detecting sensitive data further comprises detecting sensitive data based at least in part on matching regular expressions associated with sensitive data with the set of attributes included in the set of schemas.

9. The system of claim 5, wherein detecting the set of operations further comprises detecting the set of operations based at least in part on a result of performing semantic analysis on the set of code objects.

10. The system of claim 5, wherein the one or more services further comprise generating a graphical representation based at least in part on detecting sensitive data, the graphical representation indicating a location of sensitive data in a computing resource service provider environment.

11. The system of claim 5, wherein sensitive data further comprises customer private information.

12. The system of claim 5, wherein the set of attributes further comprises a set of table-keys for storing data in the one or more schemaless databases.

13. A non-transitory computer-readable storage medium comprising executable instructions that, as a result of being executed by one or more processors of a computer system, cause the computer system to at least:
  obtain a set of code objects from a data store, the set of code objects associated with a software development project;
  detect an operation on an instantiation of a schemaless database based at least in part on performing lexical analysis of the set of code objects, wherein the operation corresponds to at least one of a create, read, update, or delete operation on the schemaless database;
  generate a schema associated with the schemaless database by at least obtaining attributes of data stored in the schemaless database associated with the operation;
  detect sensitive data maintained in the schemaless database based at least in part on the schema; and
  provide a location of the sensitive data.

14. The non-transitory computer-readable storage medium of claim 13, wherein the instructions further comprise instructions that, as a result of being executed by the one or more processors, cause the computer system to generate the schema for the schemaless database based at least in part on attribute data.

15. The non-transitory computer-readable storage medium of claim 14, wherein the instructions that cause the computer system to detect sensitive data further include instructions that cause the computer system to detect sensitive data by at least comparing the schema with at least one other database schema associated with sensitive data.

16. The non-transitory computer-readable storage medium of claim 13, wherein the instructions further comprise instructions that, as a result of being executed by the one or more processors, cause the computer system to:
  obtain additional attribute data; and
  detect additional sensitive data based at least in part on attribute data and additional attribute data.

17. The non-transitory computer-readable storage medium of claim 13, wherein the instructions that cause the computer system to detect the operation on the instantiation of the schemaless database further include instructions that cause the computer system to detect the operation based at least in part on semantic analysis of the set of code objects.

18. The non-transitory computer-readable storage medium of claim 13, wherein the instructions that cause the computer system to detect the operation on the instantiation of the schemaless database further include instructions that cause the computer system to detect the operation based at least in part on machine learning analysis of the set of code objects.

19. The non-transitory computer-readable storage medium of claim 13, wherein the instructions that cause the computer system to detect the operation on the instantiation of the schemaless database further include instructions that cause the computer system to detect the operation based at least in part on a result of performing pattern matching on the set of code objects.

20. The non-transitory computer-readable storage medium of claim 19, wherein the instructions that cause the computer system to perform pattern matching on the set of code objects further include instructions that cause the computer system to perform pattern matching using one or more regular expressions.

* * * * *